US011580093B2

(12) United States Patent
Brun et al.

(10) Patent No.: US 11,580,093 B2
(45) Date of Patent: Feb. 14, 2023

(54) ASYNCHRONOUS DATABASE SESSION UPDATE

(71) Applicant: Amadeus S.A.S., Biot (FR)

(72) Inventors: Pierre Brun, Valbonne (FR); Tony Bisegna, Vallauris (FR); Nicolas Clerc Renaud, Castagniers (FR); Ahmed Amine El Hassen, Antibes (FR); Anais Sandamiani, Nice (FR)

(73) Assignee: Amadeus S.A.S., Biot (FR)

( * ) Notice: Subject to any disclaimer, the term of this patent is extended or adjusted under 35 U.S.C. 154(b) by 115 days.

(21) Appl. No.: 17/325,420

(22) Filed: May 20, 2021

(65) Prior Publication Data
US 2021/0365435 A1 Nov. 25, 2021

(30) Foreign Application Priority Data

May 21, 2020 (FR) .................................... 2005395

(51) Int. Cl.
*G06F 16/00* (2019.01)
*G06F 16/23* (2019.01)

(52) U.S. Cl.
CPC ...... *G06F 16/2365* (2019.01); *G06F 16/2379* (2019.01)

(58) Field of Classification Search
CPC ............. G06F 16/2365; G06F 16/2379; G06F 16/2308
See application file for complete search history.

(56) References Cited

U.S. PATENT DOCUMENTS

| 6,564,215 | B1 * | 5/2003 | Hsiao ................... G06F 11/1469 |
| 6,581,075 | B1 * | 6/2003 | Guturu ................... G06F 16/273 |
| 7,444,333 | B2 * | 10/2008 | Jacobs ................... H04L 69/329 |
| 7,948,952 | B2 * | 5/2011 | Hurtta ................... H04M 7/006 370/338 |
| 10,250,693 | B2 * | 4/2019 | Colrain ................... H04L 67/01 |
| 11,443,250 | B1 * | 9/2022 | Peck-Walden ......... G06Q 40/04 |
| 11,488,244 | B2 * | 11/2022 | Studnitzer .............. G06Q 40/04 |

(Continued)

OTHER PUBLICATIONS

Elmasri, R. "Fundamentals of Database Systems—Validation (Optimistic) Concurrency Control Techniques, Recovery Concepts, Checkpoints in the System Log and Fuzzy Checkpointing." Fundamentals of Database Systems, Elmasri R., Navathe S. B, Boston, MASS. [UA] Pearson, Addison-Wesley (2004): 551-635.

(Continued)

*Primary Examiner* — Noosha Arjomandi
(74) *Attorney, Agent, or Firm* — Thompson Hine LLP (57) ABSTRACT

Systems and methods for handling database transactions within a database session. A first client request to update a first data piece of a database session is received. A first response to the first client request indicates an update of the first data piece in accordance with the first request and publishes the update to enable further processing of the updated first data piece. An indication indicates that the updated first data piece is to be further updated and/or a second data piece of the database session is to be updated. A second client request is received to update a third data piece of the database session and a second response to the second client request indicates an update of the third data piece in accordance with the second request and an update of the updated first data piece in accordance with the indication.

23 Claims, 9 Drawing Sheets

(56) References Cited

U.S. PATENT DOCUMENTS

| | | | |
|---|---|---|---|
| 2002/0198883 A1* | 12/2002 | Nishizawa | G06F 16/9574 |
| 2007/0220155 A1* | 9/2007 | Nalla | H04L 67/141 |
| | | | 709/227 |
| 2013/0132335 A1* | 5/2013 | Yang | G06F 16/23 |
| | | | 707/E17.005 |
| 2013/0346123 A1 | 12/2013 | Pelissier et al. | |
| 2013/0346126 A1 | 12/2013 | Kemmer et al. | |
| 2017/0075902 A1* | 3/2017 | Hoffner | G06F 16/252 |
| 2017/0220621 A1 | 8/2017 | Colrain et al. | |
| 2019/0317838 A1* | 10/2019 | Kavanagh | G06F 9/546 |
| 2019/0377810 A1* | 12/2019 | Soni | G06F 16/2272 |
| 2020/0065334 A1* | 2/2020 | Rodriguez | H04M 3/5183 |
| 2020/0081996 A1* | 3/2020 | Chuprun | G06F 16/1744 |
| 2021/0365435 A1* | 11/2021 | Brun | G06F 16/2379 |
| 2022/0044319 A1* | 2/2022 | Amicangioli | G06Q 20/027 |
| 2022/0350642 A1* | 11/2022 | Poddar | G06F 9/4843 |

OTHER PUBLICATIONS

National Institute of Industrial Property, Preliminary Search Report issued in French Patent Application No. 2005395 dated Nov. 12, 2020.

\* cited by examiner

ASYNCHRONOUS DATABASE SESSION UPDATE

TECHNICAL FIELD

The present disclosure relates to computer-utilized database technology. More specifically, it relates to handling database transactions within a database session.

BACKGROUND

Database operations between computerized client systems and database systems are effected by database transactions. Upon requests being made by a client system, one or multiple data records stored in a database system are loaded, possibly manipulated and written back to the database system by one or multiple database transactions.

A performance metric for handling database transactions is response time which relates to the time between a client request and a response from the database system confirming or effecting the requested database transactions. Longer response times imply an idling state at the client system (while it waits for a response) and thus an inefficient utilization of system resources. Hence, shortened response times for processing database transactions are generally desirable from a technical point of view in order to increase utilization efficiency of system resources.

SUMMARY

The present disclosure is generally directed to decreasing response time of database transactions which are effected in a database session.

According to a first aspect, a method for processing a database session is provided. The database session is maintained in a database system comprising one or more clients, a database session server and a source database. The database session server maintains the database session with one of the clients. The database session comprises a plurality of data pieces loaded from the source database to the database session server. The method comprises, at the database session server during the database session: receiving, from the client, a first request to update at least a first data piece of the database session; responding, to the client, with a first response to indicate an update of the first data piece in accordance with the first request; publishing the update of the first data piece to enable further processing of the updated first data piece and/or any second data piece of the database session related to the updated first data piece using the source database; processing a first indication indicating that the updated first data piece is to be further updated and/or a second data piece of the database session is to be updated; receiving, from the client, a second request to update at least a third data piece of the database session; and responding, to the client, with a second response to indicate an update of the third data piece in accordance with the second request and an update of the updated first data piece and/or an update of the second data piece in accordance with the processed first indication.

In some examples, further processing any second data piece of the database session related to the updated first data piece comprises determining whether the update of the first data piece causes a data inconsistency with any second data piece of the database session. The indication indicates that the second data piece of the database session is to be updated in order to re-establish data consistency with the updated first data piece. The second response includes an indication of the updated of the second data piece of the database session which re-establishes data consistency with the updated first data piece.

In some examples, the second request comprises a request to further update the updated first data piece. The method comprises, at the database session server: responding, to the client, with the second response to indicate the further update of the updated first data piece in accordance with the second request, but omitting indicating the update of the updated first data piece and/or an update of the second data piece in accordance with the processed indication; publishing the further update of the updated first data piece to enable further processing of the further updated first data piece and/or any second data piece of the database session related to the further updated first data piece using the source database; processing a second indication indicating that the further updated first data piece is to be still further updated and/or the second data piece of the database session is to be updated; receiving, from the client, a third request to update at least a fourth data piece of the database session; and responding, to the client, with a third response to indicate an update of the fourth data piece in accordance with the third request and a still further update of the further updated first data piece and/or an update of the second data piece in accordance with the processed second indication.

In some examples, when both, the first indication and the second request indicate an update of the second data piece, the method further comprises, at the database session server: performing a consistency check between the update of the second data piece indicated in the second request and the update of the second data piece indicated in the first indication; in response to determining that the update of the second data piece indicated in the first indication is consistent with the update of the second data piece indicated in the second request, applying both updates to the second data piece to form an updated second data piece and including the updated second data piece in the second response.

In some examples, the method comprises, at the database session server: in response to determining that the update of the second data piece indicated in the first indication is inconsistent with the update of the second data piece indicated in the second request, discarding the update indicated in the first indication, applying the update indicated in the second request to the second data piece to form the updated data piece and including the updated second data piece in the second response; publishing the updated second data piece to enable further processing of the updated second data piece and/or any data piece of the database session related to the updated second data piece using the source database.

Some examples further comprise, at the database session server: receiving multiple requests from the one or more clients to update one of more of the data pieces of the database session between responding with the first response and receiving the second request.

Some examples further comprise, at the database session server: receiving, from the client, a commit request to terminate the database session and write back any updates to the data pieces of the database session processed during the database session to the source database; performing a consistency procedure of the updates to the data pieces of the database session processed during the database session against the source database; executing the commit request and writing back the updated data pieces of the database session to the source database in response to the consistency procedure being successful.

According to a second aspect, a database session server for processing a database session is provided. The database session server maintains the database session with a client, the database session comprising a plurality of data pieces loaded from a source database to the database session server. The database session server is arranged to: receive, from the client, a first request to update at least a first data piece of the database session; respond, to the client, with a first response to indicate an update of the first data piece in accordance with the first request; publish the update of the first data piece to enable further processing of the updated first data piece and/or any second data piece of the database session related to the updated first data piece using the source database; process a first indication indicating that the updated first data piece is to be further updated and/or a second data piece of the database session is to be updated; receive, from the client, a second request to update at least a third data piece of the database session; and respond, to the client, with a second response to indicate an update of the third data piece in accordance with the second request and an update of the updated first data piece and/or an update of the second data piece in accordance with the processed first indication.

In some examples, the database session server is further arranged to perform any one of the method examples set forth above.

According to a third aspect, a computer program product is provided with comprises program code instructions stored on a computer readable medium to execute the method steps according to any one of the method aspects and examples set forth above when said program is executed on a computer.

BRIEF DESCRIPTION OF THE DRAWINGS

Aspects and examples of the present disclosure are described with reference to the following figures, in which.

DETAILED DESCRIPTION

The present disclosure relates to processing a database session which is established and maintained in a database system. A schematic view of the database system 1 is given by FIG. 1. The database system 1 includes one or more client systems 6, briefly referred to as clients 6. Non-limiting examples of clients 6 are computerized stations comprising hardware and software elements such as personal computers, mobile computers such as laptops or tablet computers, mobile phones such as smartphones, server systems, as well as software components such as applications running on one or more of the aforementioned computerized stations, as well as combinations thereof.

Figure 1:
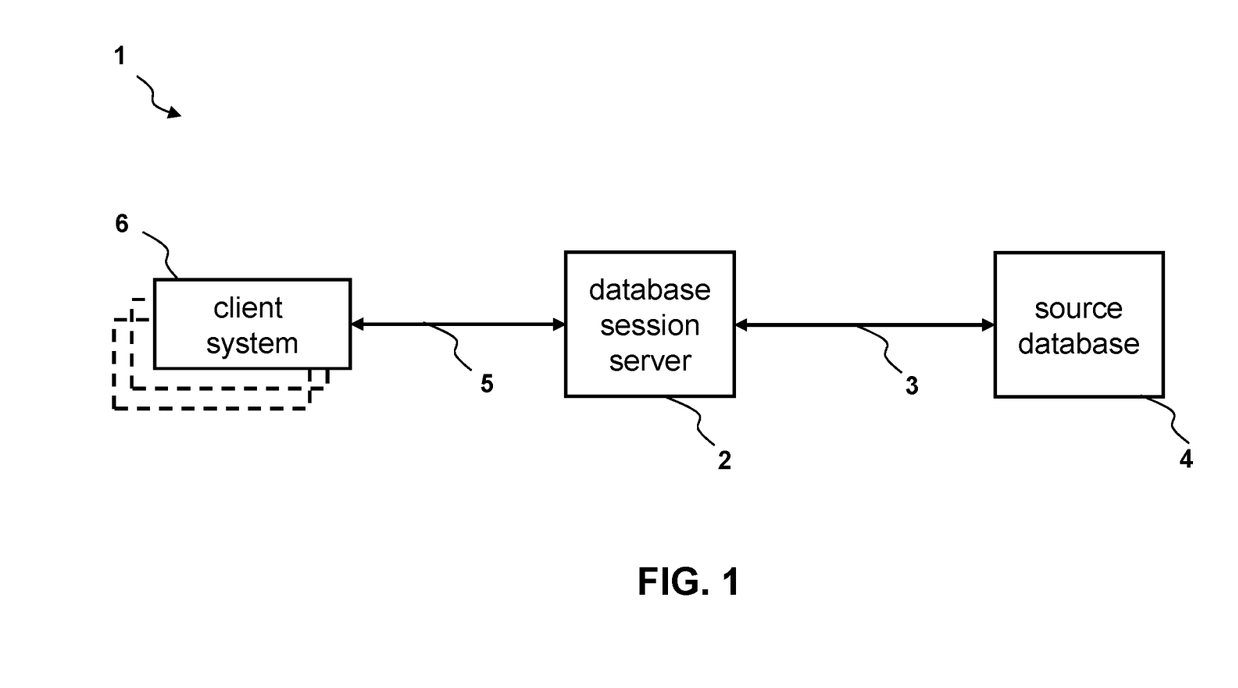
FIG. 1 shows elements of a database system including a database session server implementing the methodologies described herein.

The database system 1 further includes a database session server 2 which is communicatively coupled with the one or more clients 6 by way of a communication interface 5. The communication interface 5 may be a wired and/or wireless as well as a local or remote networked connection such as a connection via the Internet. A part of the communication interface 5 may be implemented by way of a mobile communication network such as a 3G/4G/5G network according to ETSI/3GPP specifications and/or a WiFi/WLAN network according to IEEE specifications.

The database session server 2 maintains a database session 32 (cf. FIG. 4) with one of the clients 6. Multiple database sessions may be maintained with this client 6 at the same time. The database session server 2 is also be arranged to maintain multiple database sessions with multiple clients 6 at the same time, but only one database session with one of the clients 6 is considered in the following for reasons of simplicity and brevity. It is however understood that the methodologies described herein can concurrently occur at the database session server 2 for multiple clients 6.

A database session 32 is an established connection between the client 6 and the database session server 2 in which the client can perform transactions on a number of data pieces which have been loaded into the database session server 2. The transactions may include read and write transactions. By way of a write transaction, the client 6 can request a modification or manipulation of a data piece currently kept in the database session server 2, hereinafter referred to as update.

A database session may be initiated upon a particular request from the client 6 to establish the database session. In response to receiving such request from the client 6, the database session server 2 contacts a source database 4 which is also part of the database system 1 shown by FIG. 1. The source database 4 maintains a collection of data pieces, a number of which are loaded from the source database 4 to the database session server 2 as part of the database session and can then be read and/or update by the client 6 within the database session. Note that loading data pieces from the source database 4 can also occur within an existing database session, e.g. when the client 6 requests further data pieces that have not yet been loaded into the database session server 2 within the database session.

To facilitate loading data pieces from the source database 4 into the database session server 2 as part of the database session, the source database 4 and the database session server 2 are communicatively coupled by way of a communication interface 3. The communication interface 3 may be similar to or different from the communication interface 5. For example, the database session server 2 may be geographically co-located with the source database 4 in which case the communication interface 5 is a local area network connection. In other examples, e.g. if the database session server 2 is geographically closer located to the client 6 than the source database 4, the communication interface may utilize the Internet.

In some examples, loading data pieces from the source database 4 upon database session initiation or during the database session includes copying the data pieces from the source database 4 into the database session server 2, for example by way of SQL select statements. The source database 4 may set lock mechanisms over the loaded data pieces for reasons of data consistency. In some examples, loading data pieces from the source database 4 upon database session initiation or during the database session includes more complex and/or most costly (in terms of computation resources) database operations in order to prepare the data pieces on the basis of basic data held by the source database 4. For example, the source database 4 may be a big data system holding billions of data records, so that identifying and retrieving the number of data pieces requested by the client 6 may take considerable time. In some examples, the database session initiation request by the client may indicate search parameters of multiple dimensions so that a large number of combinations of data records held by the source database 4 have to be explored in order to load the data pieces into the database session server 2.

Figure 2:
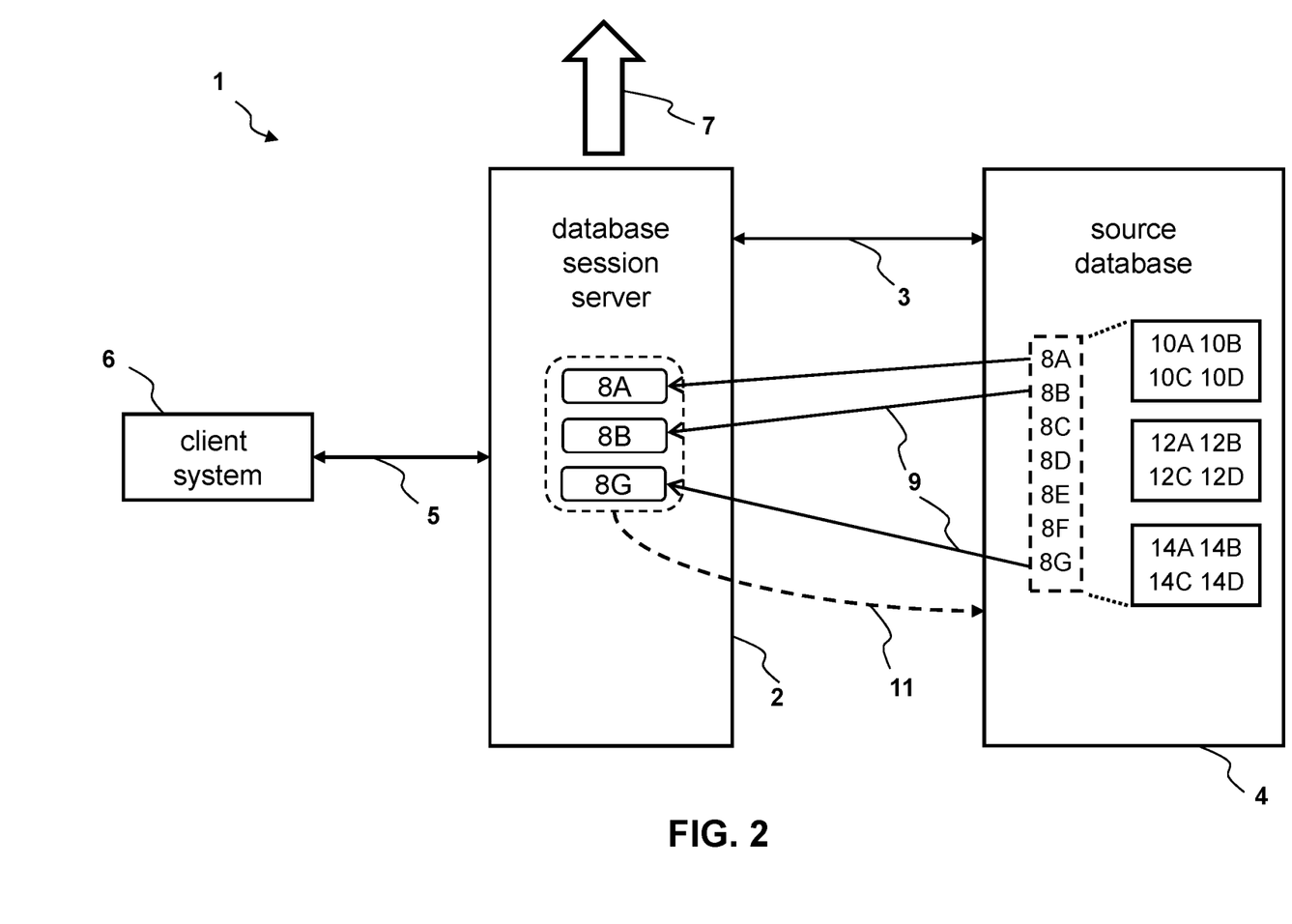
FIG. 2 visualizes loading and writing back data pieces for a database session.

The latter more complex examples of loading data pieces from the source database 4 upon database session initiation or during the database session is indicated in FIG. 2. According to the simplified example, the database session established between the client 6 and the database session server 2 includes three data pieces 8A, 8B, 8G which have been loaded from the source database 4. At loading time, i.e. when the database session server 2 contacts the source database 4 e.g. in response to the database session initiation request in order to load the data pieces requested by the client 6 for the database session, the source database 4 processes underlying data records 10A-10B-10C-10D, 12A-12B-12C-12D, 14A-14B-14C-14D in order to obtain the data pieces 8A to 8G from which the three data pieces 8A, 8B, 8G e.g. fulfil search parameters indicated by the client 6 and are therefore returned 9 to the database session server 2 at which they are stored in order to be further processed within the database session.

As will be described in more detail below, the database session may be terminated by way of a commit transaction which includes, inter alia, writing back 11 any updates taken on the data pieces of the database session to the source database 4.

Generally, the database session server 2 improves response times of individual database transactions requested by the client 6 on the number of data pieces that are part of the database session compared to operating directly on the source database 4. The database session server 2 may hold the number of data pieces in a fast-access memory and does not require complex database operations such as joins, merge, union, etc. Furthermore, the database session server 2 may also be geographically located closer to the client 6 than the source database 4, e.g. in a datacentre in the same country in which the client 6 is currently located, while the source database 4 may be located in a different continent. Hence, for one or more of these reasons, the client 6 is enabled to perform read and write operations on the data pieces included in the database session with the database session server 2 in an accelerated manner as compared to performing these operations on the source database 4.

Figure 3:
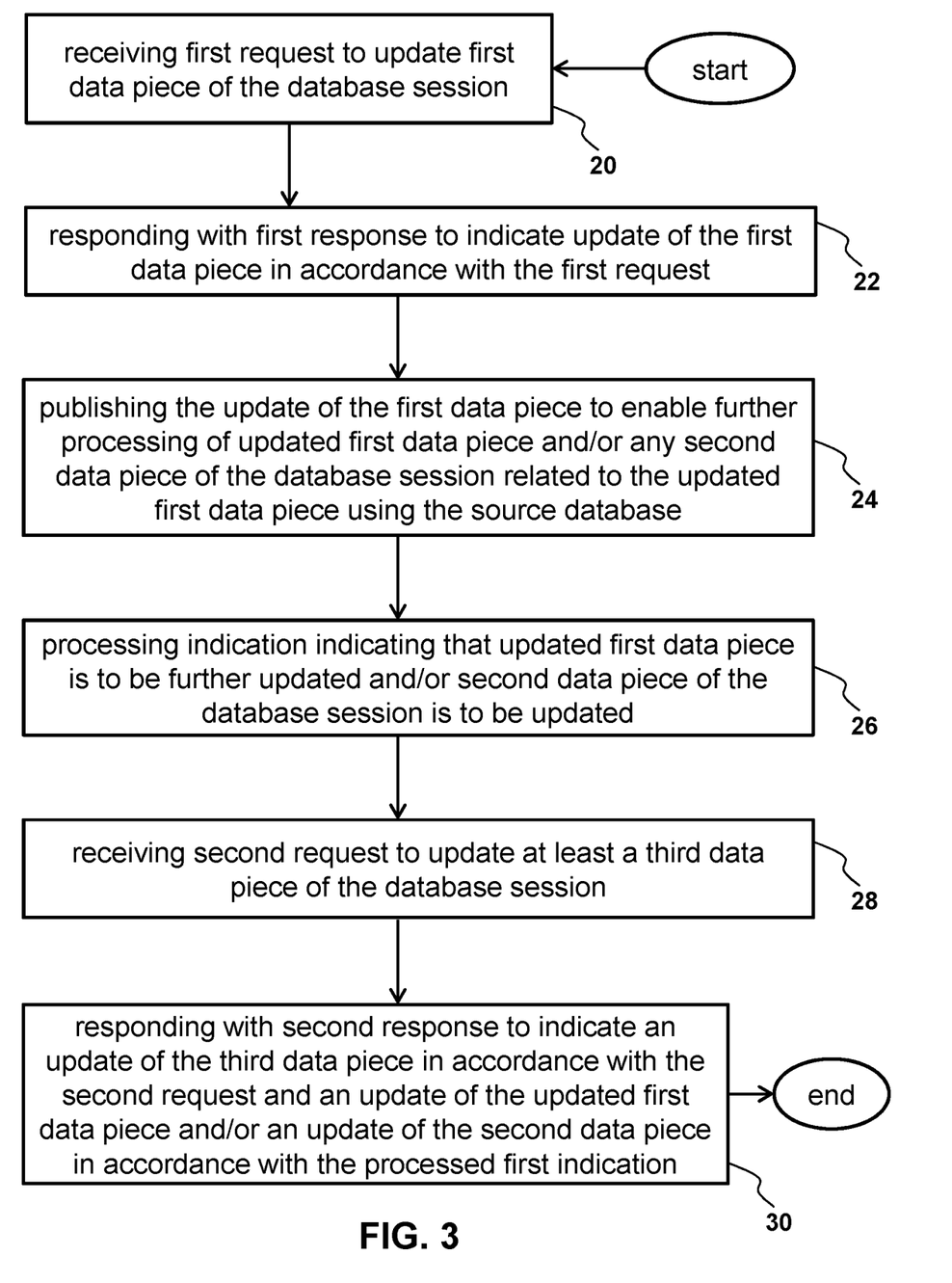
FIG. 3 sets out a general methodology of processing a database session as described herein.
Figure 4:
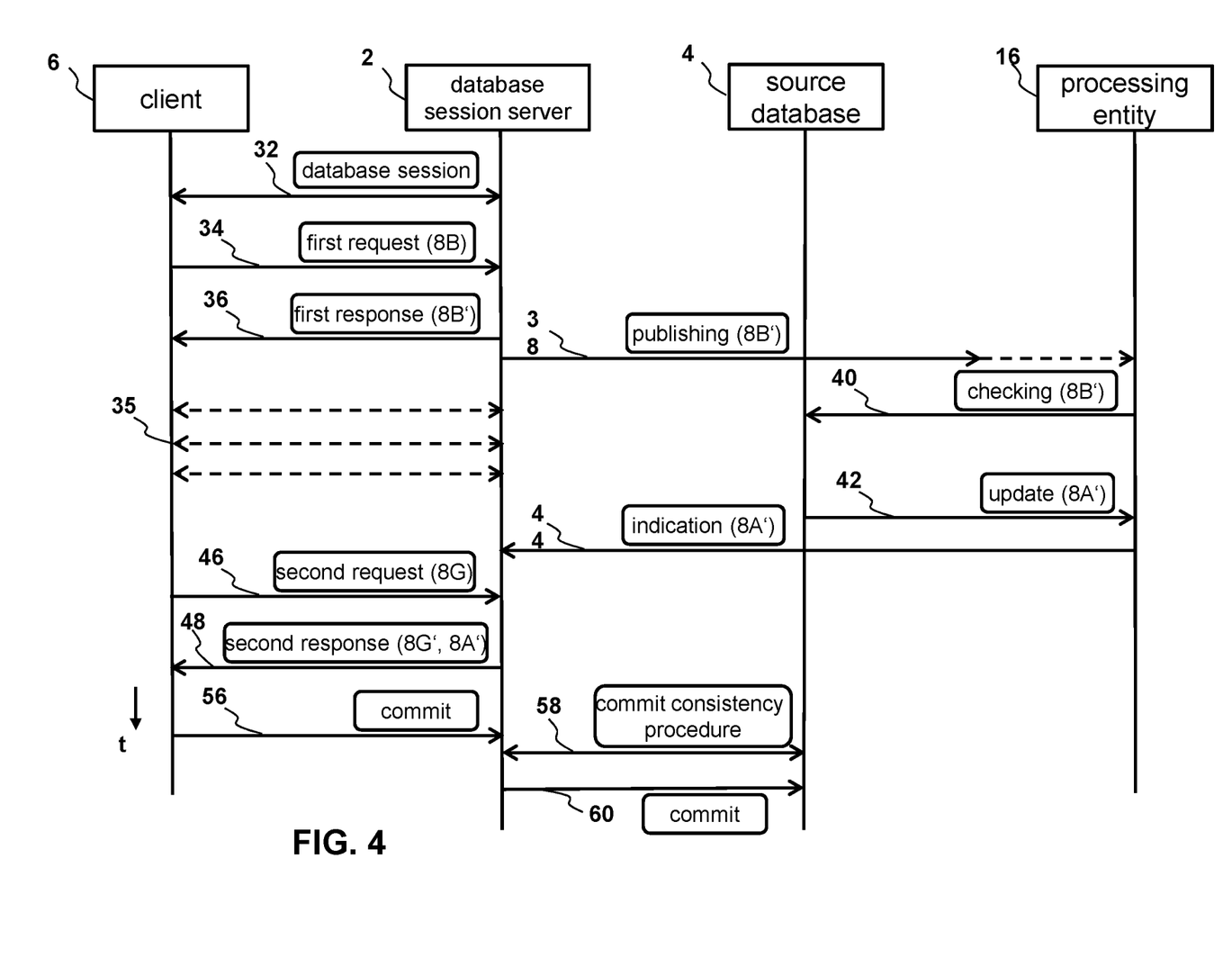
FIG. 4 is a message sequence chart according to some examples taught herein.
Figure 5:
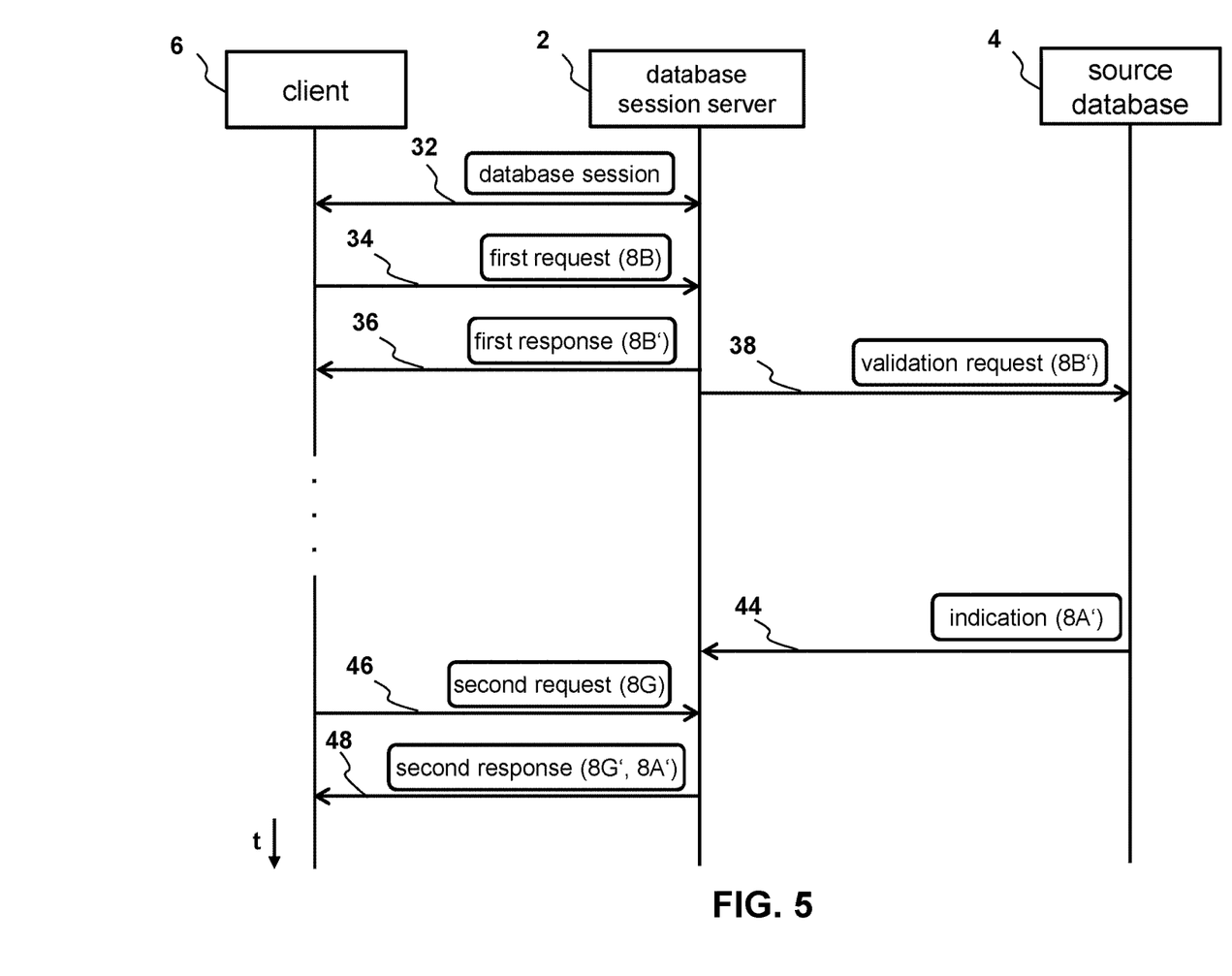
FIG. 5 refers to more particular data consistency checking examples.

In prior art systems, such as FIGS. 3, 4 and 5 of US 2017/0075902 A1, responses to transaction requests from client systems can be substantially delayed despite employing an intermediate entity such as a database session server due to interrogations or validations with backend systems such as a source database during processing a client request. In these prior art systems, a response to a client request is only returned after such backend interrogations/validations have been commenced. Due to the significant time required for such backend interrogations/validations (compared to the quicker intermediate entity such as a database session server), this delay might be in the order of magnitude (e.g. seconds vs. milliseconds) and therefore substantial.

The methodologies for processing the database session include a method performed at the database session server 2, a database session server 2, and a computer program comprising program instructions executed by a database session server 2 with the following activities/functions (FIG. 3) to address these drawbacks of prior art systems such as US 2017/0075902 A1.

With reference to FIG. 3, after the database session between the client 6 and the database session server 2 has been established, at 20, the database session server 2 receives, from the client 6, a first request to update at least a first data piece of the database session. At 22, the database session server 2 responds, to the client 6, with a first response to indicate an update of the first da-ta piece in accordance with the first request. Then, at 24, the database session server 2 publishes the update of the first data piece to enable further processing of the updated first data piece and/or any second data piece of the database session related to the updated first data piece using the source database. Thereafter, at 26, the database session server 2 processes a first indication indicating that the updated first data piece is to be further updated and/or a second data piece of the database session is to be updated. At some later point in time, at 28, the database session server 2 receives, from the client 6, a second request to update at least a third data piece of the database session. Then, at 30, the database session server 2 responds, to the client 6, with a second response to indicate an update of the third data piece in accordance with the second request and an update of the updated first data piece and/or an update of the second data piece in accordance with the processed first indication.

This procedure makes use of the time after the first response to the client to further process the updated first data piece or any second data piece related to the updated first data piece. In other words, the first response indicating a local update of the first data piece at the database session server 2 is returned immediately (without e.g. contacting the source database 4) in order to ensure a faster response time than in the prior art mentioned above. Processing which may involve the (slower) source database 4 is deferred and performed in a time interval between the first response and a later subsequent second request by the client 6. The result of this further processing is then returned to the client 6 at that later point in time with the second response which answers this subsequent second request.

A more specific example is given by FIG. 4 which is also used to describe details and non-limiting examples of some of the features shown by FIG. 3 such as the publishing activity/function and the further processing.

The message sequence of FIG. 4 assumes that a database session 32 has been established between the client 6 and the database session server 2, and the number of data pieces have thus been loaded from the source database 4 into the database session server 2 as described above. The example of FIG. 4 as well as the further examples of FIGS. 5 to 8 make reference to the exemplary data pieces 8A to 8G shown in FIG. 2.

The client 6 sends a first request 34 to the database session server 2 requesting an update of the data piece 8B. Note that the term first request does not imply that no previous request has occurred within the database session 32, but is—as usual—meant as a designation to differentiate this request from other requests such as the second request and third request as well as database session initiation requests and commit requests as already mentioned above.

The first request 34 is received by the database session server 2 via the communication interface 5 and processed in accordance with a database transaction protocol employed at the database session server 2. The database session server 2 executes the requested update of the data piece 8B, resulting in an updated data piece 8B'. In examples, the database session server 2 continues to store both, the previous version of the data piece 8B and the updated version of the data piece 8B' in memory. The database session server 2 then returns the updated data piece 8B' to the client 6 by way of the first response 36 via the communication interface 5.

In addition, the database session server 2 publishes 38 the updated data piece 8B' to enable further processing by another entity. Publishing 38 may occur concurrently to returning the first response 36 to the client 6. Depending on the current load of the database session server 2, publishing 38 may also be deferred to some extent, as this activity is generally less time-critical than the returning the first response 36 to the client 6.

The term publishing generally refers to making available the updated data piece 8B' (and generally, all updates to data pieces occurring during the database session 32) to any further processing entity 16. For example, the database session server 2 may store the updated data piece 83 at a location internal or external to the database session server 2, such as in a pool or queue of updated data pieces to be further processed, from where the processing entity 16 is able to retrieve the updated data piece 8B' (as visualized by the solid/dotted arrow combination of publishing 38 in FIG. 4). The database session server 2 may notify the processing entity 16 about the possibility of retrieving the updated data piece 8B' from this location. The point of time when the processing entity 16 actually retrieves the updated data piece 8B' from the pool or queue may depend on the current load of the processing entity 16 and/or any prioritization of updated data pieces to be further processed.

In other examples, publishing 38 is implemented by a request/response protocol according to which the database session server 2 transmits the updated data piece 8B' to the processing entity 16 and the processing entity 16 may acknowledge receipt of the updated data piece 8B'. If more than one processing entity 16 is able to process the updated data piece 8B', the database session server 2 or any other entity not shown by FIG. 4 may select one of the multiple processing entities available.

The database session server 2 may utilize a further communication interface 7 (cf. FIG. 2) for publishing 38 the updated data piece 8B' to an external location. Note that, in some examples, also the source database 4 itself acts as the processing entity 16 (cf. the example of FIG. 5) in which case the database session server may utilize the same communication interface 3 for communicating with the source database as for establishing and terminating database sessions 32.

The term publishing also refers to the fact that the database session server 2 afterwards continues normal operation with the client 6 within the database session 32. That is, the client 6 may submit one or more further requests 35 to the database session server 2, and the database session server 2 processes and responds to these further requests 35 in the normal manner according to the database transaction protocol employed by the database session server 2. Any update of data pieces effected by these further requests 35 may also cause corresponding further publishing activities 38.

Hence, for the operation towards the client 6, the database session server 2 does not specifically wait for any response from the processing entity 16 with a result of further processing the updated data piece 8B'. As a consequence, any notification from the processing entity 16 in response to a publishing activity 38 arrives at database session server 2 at any arbitrary point in time, i.e. asynchronously. It is also noted that one or more publishing activities 38 caused by further requests 35, the database session server 2 never receives any response whatsoever, e.g. when further processing by the processing entity 16 yields that no data piece of the database session is to be further updated.

Asynchronous reception of indications 44 may be implemented at the database session server 2 e.g. by way of an indication listener which listens to any possibly arriving indications 44 independently from any request/response activities occurring with one or more of the clients 6.

Further processing the updated data piece may refer to any sort of processing which involves the source database 4 and thus renders the further processing substantially slower than the database transactions which are executed between the client 6 and database session server 2 by way of requests from the client 6 and respective responses from the database session server 2. For example, further processing the updated data piece 8B' may relate to any sort of verification or validation of the update of the data piece 8B to become the updated data piece 8B', based on other data pieces and/or underlying data stored at the source database 4. Hence, these types of further processing may result in a confirmation or rejection of the update. In some examples, further processing may relate to data enrichment according to which the update taken to the data piece 8B may be further enriched with additional data which is based on data stored by the source database 4.

In some examples, further processing may relate to validating one or more other data pieces which are related to the update data piece 8B', in particular one of more data pieces which are part of the database session 32 with the client 6 and are therefore currently stored by the database session server 2, against the update taken to the data piece 8B. This validation may yield whether or not these one or more other data pieces require any update. Again, this validation involves the slower source database 4.

An example of this sort of further processing is shown by FIG. 4 according to which further processing includes the processing entity 16 sending a check request 40 to the source database 4 which requests the source database 4 to determine whether the update that has been taken to the data piece 8B requires any update of any other data piece which is related to the data piece 8B. In the example of FIG. 4, the source database 4 determines that the data piece 8A, which is relates to the data piece 8B and which is also a part of the database session 32 (cf. FIG. 2), is to be updated to data piece 8A' in view of the update taken to the data piece 8B. Hence, the source database 4 responds with the response 42 indicating that the data piece 8A is to be updated to the updated data piece 8A'. It is understood that the further processing may yield that multiple data piece of the database session 32 are to be updated in which case the indication 44 indicates an update of these multiple data pieces of the database session 32.

In response to receiving the response 42, the processing entity 16 sends an indication 44 to the database session server 2 indicating that the data piece 8A is to be updated to the updated data piece 8A'. The indication 44 may include the update to be taken to the data piece 8A or, alternatively, the updated data piece 8A' itself. The indication may be transmitted to the database session server via any suitable communication interface, such as the communication interface 7 or the communication interface 3 via the source database 4.

In response to receiving the indication 44, the database session server 2 processes the indication 44 (e.g. stores the updated data piece 8A') and stands by for receiving a further request from the client 6. At some point of time, such further request, namely the second request 46, is received from the client 6. Generally, the second request 46 may concern any data piece that is part of the database session 32 and stored by the database session server 2. In the example of FIG. 4, the second request 46 requests an update of the data piece 8G.

In response to receiving the second request 46, the database session server 2 processes the second request 46 in the normal manner in accordance with the database transaction protocol employed and prepare a response to the second request, namely the second response 48. The second response 48 include at least two data pieces, namely the updated data piece 8G' (i.e. the actual response to the second request 46) and also the updated data piece 8A' which has been yielded from the indication 44 and in fact refers back to the first request 36 (and thus logically still forms a response to the first request 36).

As apparent to the skilled person from the example of FIG. 4, the technical advantage of this procedure over prior art systems such as US 2017/0075902 A1 is a higher responsiveness for database requests, as time between multiple database requests is utilized for further processing activities and potential second-order updates or validation results are returned to the requesting client at a later point of time piggy-backed on responses to subsequent database requests. Hence, providing the result of any further processing to the client 6 at a later point of time causes minimal network overhead.

In some examples, the general procedure described above is particularly utilized to ensure data consistency in the distributed database system 1. As discussed before, data pieces held by the distributed database system 1 may be related to each other in the way that updated one data piece may imply a corresponding update of another data piece. More specifically, the data pieces of the database session 32 may be related to each other so that updated one data piece (e.g. 8B) might require an update of another data piece of the database session (e.g. 8A) as well.

To this end, now with reference to FIG. 5, the database session server 2 may publish the updated data piece 8B' in form of a validation request 38 to the source database 4 (which acts as the processing entity 16 in the example of FIG. 5). The source database 4 determines whether or not the update which has changed the data piece 8B to become the update data piece 8B' causes a data inconsistency with any other data piece of the database session 32. In addition, the source database 4 may perform a data consistency check for any other data piece that is not or not yet handled in the database session 32 or which may be subject to any other currently existing database session.

In the example of FIG. 5, the source database 4 determines that the update of data piece 8B requires an update of related data piece 8A to become the updated data piece 8A'. Accordingly, the source database 4 sends the indication 44 with the updated data piece 8A' to the database server 2. The database server 2 then proceeds in the same manner as already described above with reference to FIG. 4.

Figure 6:
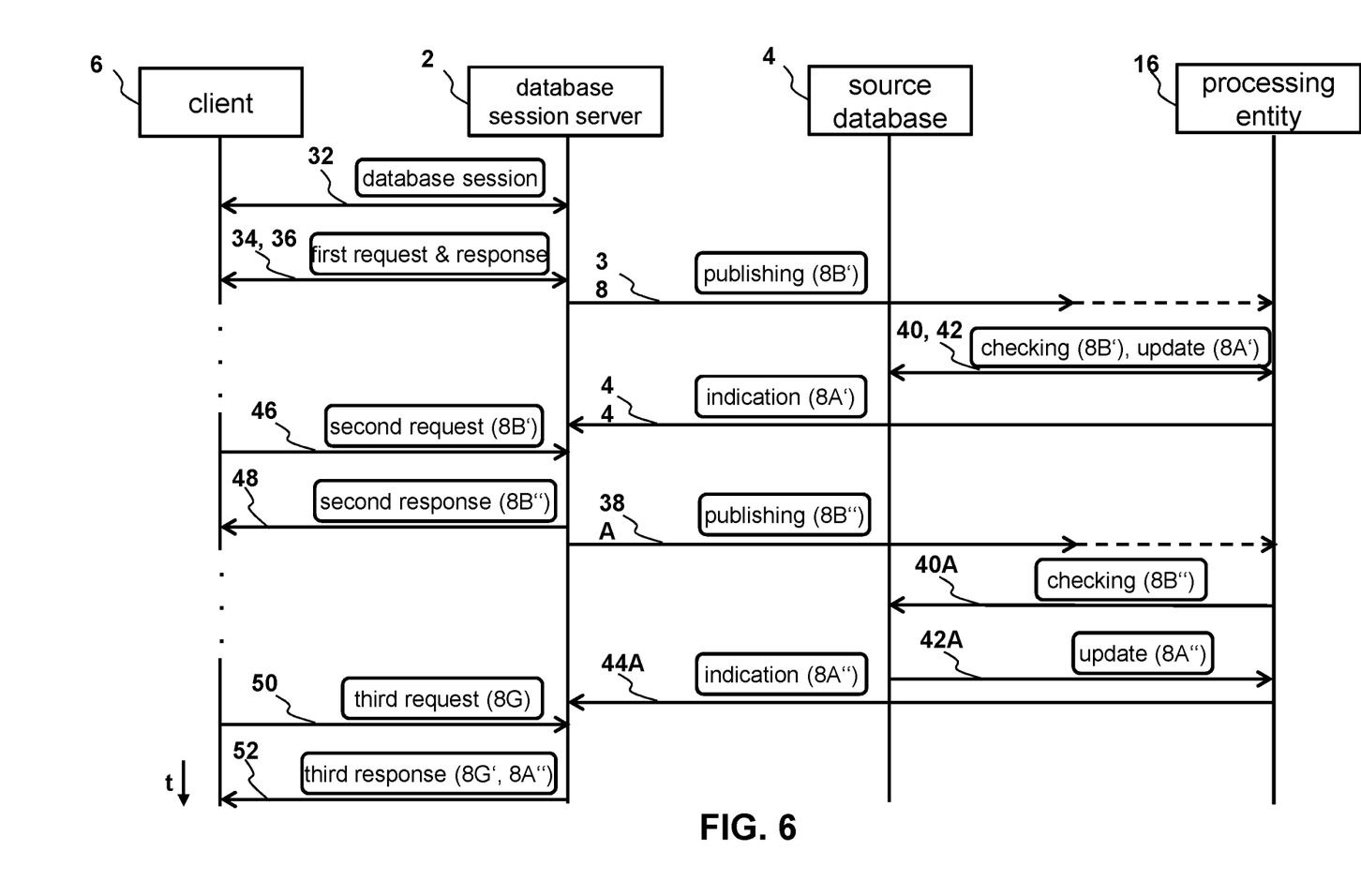
FIG. 6 relates to examples in which the same data piece is to be subsequently updated in response to client requests.
Figure 7:
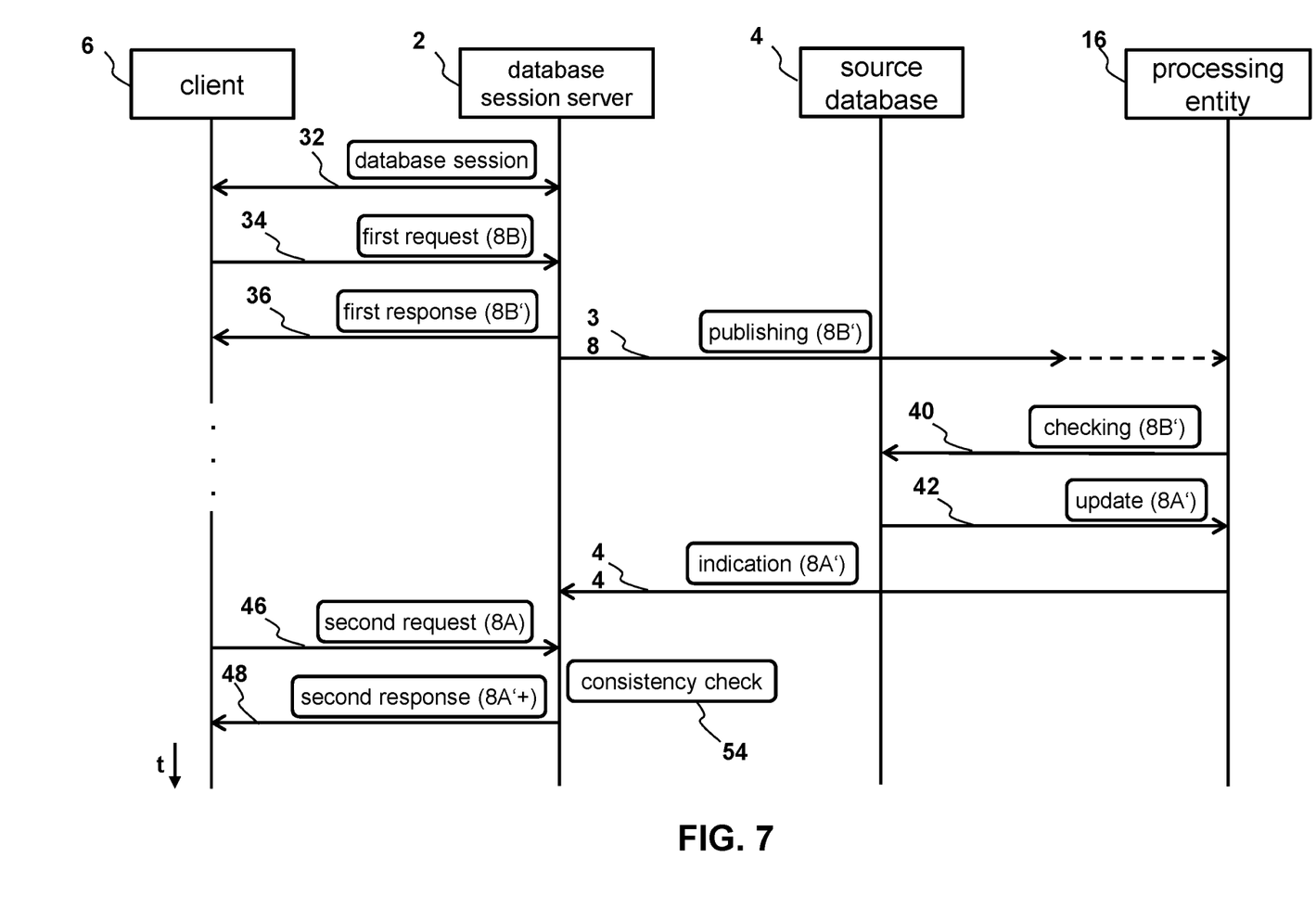
FIG. 7 concerns examples with a consistency check to resolve update of the same data piece in response to a client request and by an indication from a processing entity.
Figure 8:
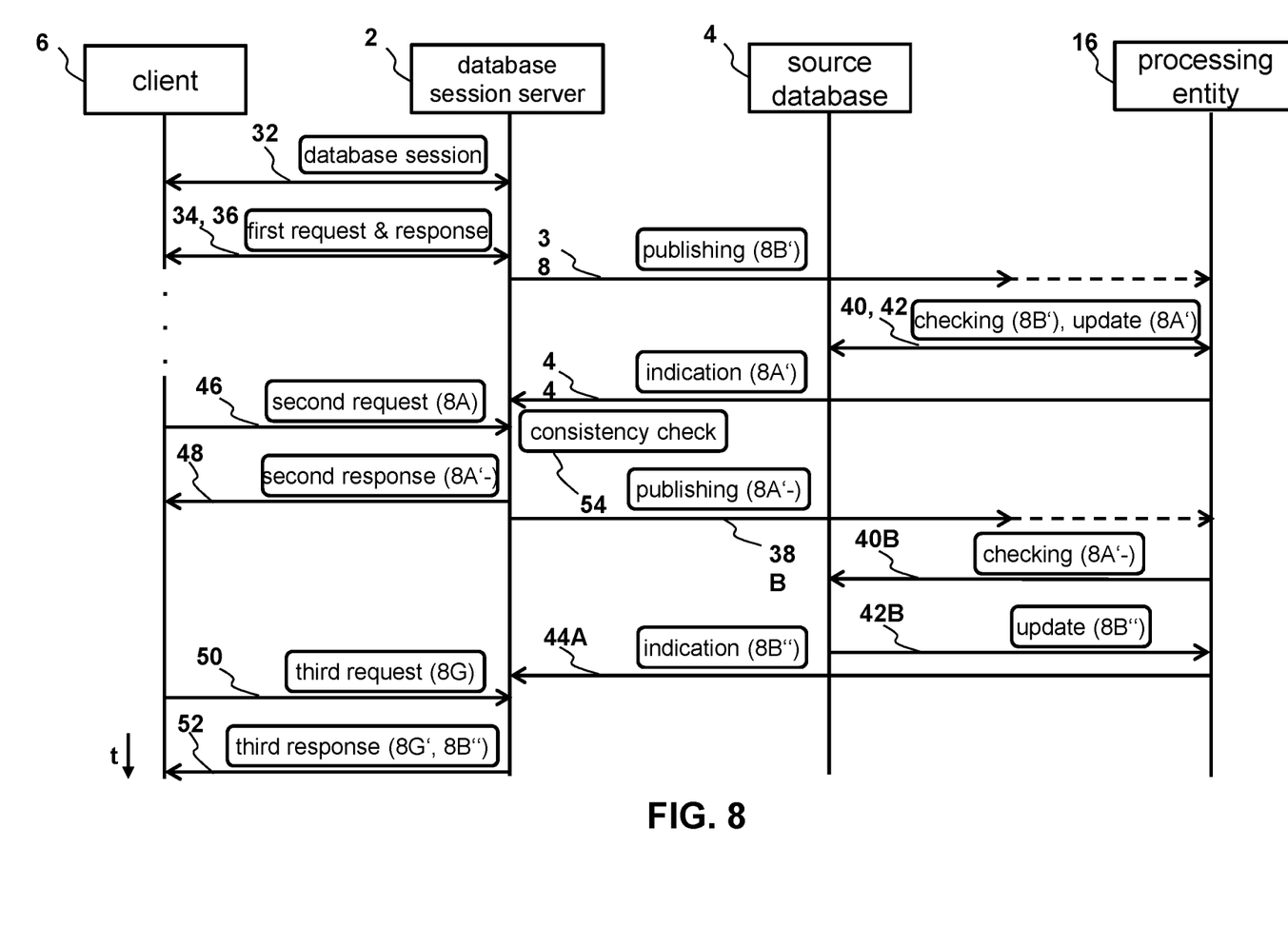
FIG. 8 depicts a situation in which the consistency check is unsuccessful and triggers a further publishing of the updated data piece.

FIGS. 6-8 show further refined examples with optional additional functionalities that may be used to handle particular subsequent requests from the client 6. For example, referring to FIG. 6, the second request 46 may concern the same data piece as the first request 34. In the example of FIG. 6, similar to FIGS. 4 and 5, the first request 34 requests an update of the data piece 8B to become updated data piece 8B' and the database session server 2 publishes the updated data piece 8B' in one of the manners as described above. The indication 44 received by the database session server 2 indicates that the data piece 8A is to be updated to become updated data piece 8A'.

Different from the examples of FIGS. 4 and 5 the second request 46 requests a further update of the previously updated data piece 8B'. The database session server 2 processes this second request 46 in the normal manner and returns the further updated data piece 8B" to the client 6. However, the result from the indication 44, i.e. the update of the data piece 8A to become the updated data piece 8A', is not included in the second response 48 here because this is outdated/overridden by the further update of the updated data piece 8B' to further updated data piece 8B". Rather, the database session server 2 again publishes the further updated data piece 8B" in one of the manners described above. The further processing by the processing entity 16, a further checking 40A of the further updated data piece 8B" with the source database 4 and a response 42A by the source database 4 indicating that the data piece 8A is to be updated to become the updated data piece 8A", is then performed in the usual manner as described above. The further indication 44A then indicates to the database session server 2 that the data piece 8A is to be updated to become the updated data piece 8A".

Processing the further indication 44A at the database session server 2 happens in the usual manner as described above. The result from the further indication 44A is provided to the client 6 with a response to any subsequent request such as the third request 50. In the example of FIG. 6, the third request concerns another data piece 8G (i.e. not data piece 8B"). Accordingly, the database session server 2 includes both, the updated data piece 8G' as well as the update of the data piece 8A to become the updated data piece 8A" in the third response 52 and returns the third response 52 to the client 6.

Another situation may arise if both, the second request 46 by the client 6 and the indication 44 received and processed by the database session server 2 concern the same data piece. Exemplary treating of this situation is shown by FIGS. 7 and 8. The activities of the first request 34 and first response 36, publishing 38, as well as further processing activities 40, 42 and the indication 44 are the same as in the examples of FIGS. 4-6. Hence, the indication 44 indicates that the data piece 8A is to be updated to become updated data piece 8A'.

The second request 46 received by the database session server 2 after receiving the indication 44 also requests an update of the data piece 8A. In this situation, the database session server 2 may perform a consistency check procedure 54 in order to determine whether or not both updates to the data piece 8A, the update as indicated by the indication 44 and the update requested by the second request 46, can be applied while data consistency of the data piece 8A/the updated data piece 8A' is ensured.

For example, both updates to the data piece 8A, the update as indicated by the indication 44 and the update requested by the second request 46, may refer to the same update of the data piece 8A in which case there is no problem to apply both updates. In another example, both updates, refer to different updates, but both updates can be reconciled by the database session server 2 without any requirement to again inquire the source database 4. A particular example of this type is present if both updates to the data piece 8A are different and the logic implemented at the database session server 2 prescribes that the update indicated by the indication 44 prevails and overrides the update requested by the client 6. In these cases of a positive outcome of the consistency check procedure 54 (FIG. 7), the database session server 2 responds to the second request 46 with the second response 48 which indicates the updated version of the data piece 8A, namely updated data piece 8A'+ (the 'plus' denoting that the consistency check had a positive result) including both updates, the update as indicated by the indication 44 and the update requested by the second request 46, or at least the update indicated by the indication 44. No additional publishing activity is thus required in these instances.

On other occasions, however, as depicted by FIG. 8, the consistency check determines that both updates, the update as indicated by the indication 44 and the update requested by the second request 46, to the data piece 8A are inconsistent (i.e. lead to a data inconsistency) and the database session server 2 is unable to reconcile the two updates without the assistance of the source database 4. In some examples, this may be the case if the update requested by the second request 46 prevails and overrides the update indicated by the indication 44, which effectively discards the indication 44.

Here, the methodologies as described above are employed, i.e. the database session server 2 may immediately return the second response 48 indicating the updated data piece 8A'- (the 'minus' denoting that the consistency check had a negative result) in accordance with the second request 46. In addition, the updated data piece 8A'- is published 38B in the normal manner as described above. The processing entity 16 checks 40B with the source database 4 whether the updated data piece 8A'- and/or any data piece related to the updated data piece 8A'- is to be further updated. In the example of FIG. 8, the source database 4 returns 42B that the data piece 8B' is again to be updated to become the further updated data piece 8B". This is signalled to the database session server 2 by way of the indication 44A. The database session server 2 then receives still a further request, the third request requesting an update of another data piece, data piece 8G. The database session server 2 then returns the third response 52 with the updated data piece 8G' as requested by the third request as well as the indication that the data piece 8B' has been updated to the further updated data piece 8B".

Moreover, now referring back to FIG. 4, the database session 32 may be terminated by way of a commit request 56 from the client 6. The database session server 2 receives the commit request 56 to terminate the database session 32 from the client 6 and to write back any updates to the data pieces 8A, 8B, 8G of the database session 32 processed during the lifetime of the database session 32 to the source database 4.

Before actually writing back these updates to the source database 4, a commit consistency procedure 58 may be performed to ensure data consistency between the updates to the data pieces of the database session 32 processed during the database session 32 against the source database 4. In examples, commit consistency procedure 58 comprises one or more consistency check requests of the session database server 2 to the source database 4, in response to which the source database 4 verifies against the data stored at the source database 4 whether the updated data pieces of the database session 32 are consistent which each other and/or whether any further database-session-external data pieces of the source database 4 are to be adapted to the updated data pieces of the database session 32. The commit consistency procedure 58 may also include one or more responses to the consistency check request(s) indicating whether or not any data piece(s) of the database session are still to be updated before the actual commit 60 to the source database 4. The commit consistency procedure 58 is useful to promote data consistency also in the context of the methodologies described herein as, for example, the commit request 56 may occur at a time where one or more further processing procedures after one or more prior publishing activities 38 are still ongoing, but possible further updates by way of one or more indications 44 have not yet been provided to the database session server 2.

In response to a successful commit consistency procedure 58, the database session server 2 executes the commit request 56 and writes back the updated data pieces of the database session 32 to the source database 4, e.g. by way the commit command 60. In response to an unsuccessful commit consistency procedure 58, the commit request 56 may be rejected and/or any updates to data pieces of the database session 32 are rolled back and the database session 32 is terminated with the updates being discarded.

In some examples, which can be applied in any one of the situations explained above such as those of FIGS. 4-8, publishing 38 may include publishing more data of the database session 32 than the data piece which was subject of the first request 34. This additional data may further facilitate and render more efficient further processing of the processing entity 16. For example, publishing 38 may include publishing the entire database session 32 including all data pieces maintained by the database session 32. This may enable the processing entity 16, at least in some occasions and/or for some use-cases of further processing, to perform the further processing without having to consult the source database 4. As the further processing will still be more computation-resource- and time-consuming than handling the database transactions between the database session server 2 and the client 6, the aforementioned technical advantages are also achieved for these instances of further processing.

According to a non-limiting example, the database session 32 is a reservation session which handles travel itinerary data pieces, one or more passenger name records (PNR), priced travel recommendations, and so forth. The database session server 2 receives e.g. shopping requests from the client 6 requesting reservation of a particular travel product which may lead to an update of a PNR handled within the reservation session. The update of the PNR can be immediately confirmed by the database session server 2, but further validations such as verifying whether a requested ancillary service (e.g. a special meal or a baby cot) is actually available. These time-consuming further validations can be performed "in the background" by way of the publishing 38 and further processing 40, 42 activities as described above.

Figure 9:
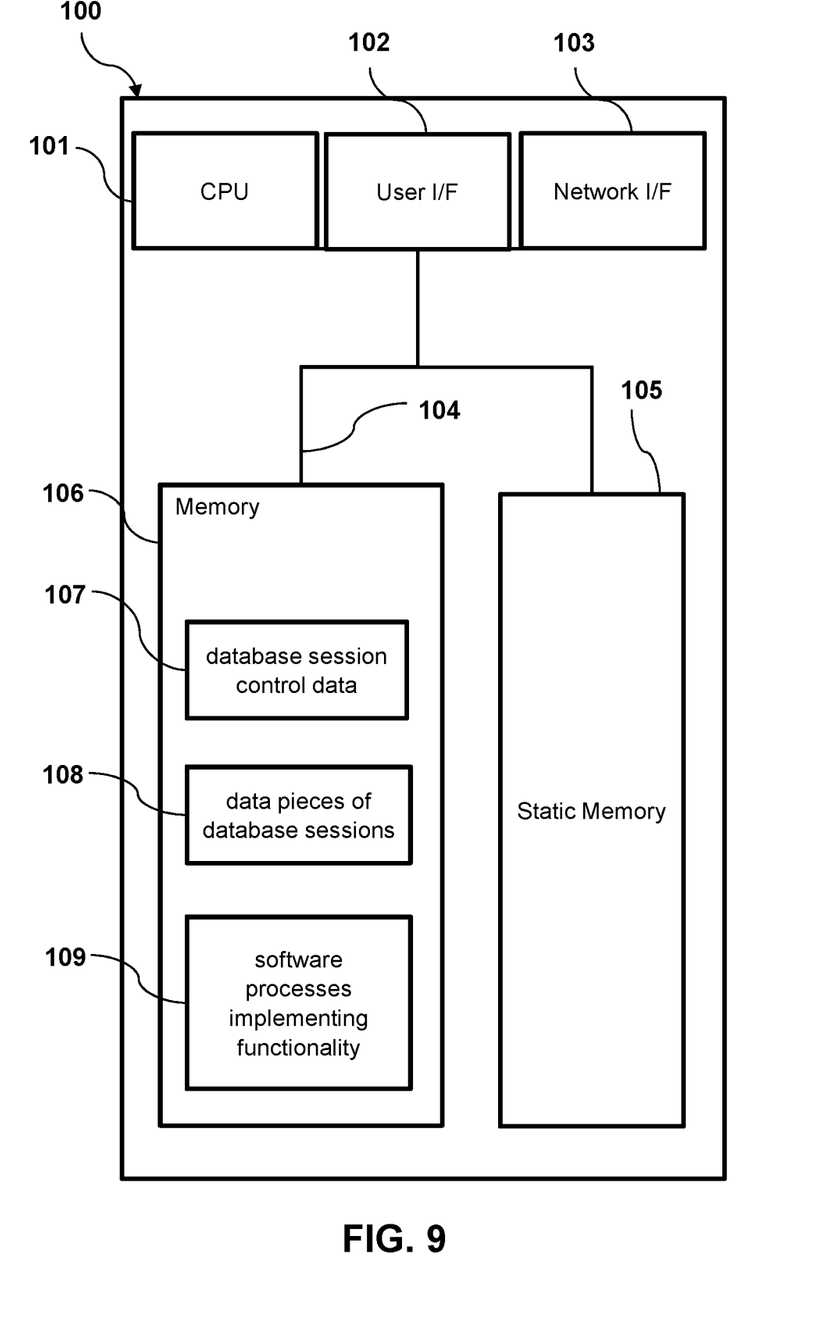
FIG. 9 shows an example of an internal structure of a computerized platform implementing the database session server described herein.

FIG. 9 is a diagrammatic representation of the internal component of a computing machine 100 implementing the database session server 2. Similar computing machines may also realize one or more of the clients 6, the source database 4 and/or the processing entity 16. The computing machine 100 includes a set of instructions to cause the computing machine 100 to perform any of the methodologies discussed herein when executed by the computing machine 100. The computing machine 100 includes at least one processor 101, a main memory 106 and a network interface device 103 which communicate with each other via a bus 104. Optionally, the computing machine 100 may further include a static memory 105 and a disk-drive unit. A video display, an alpha-numeric input device and a cursor control device may be provided as examples of user interface 102. The network interface device 103 connects the computing machine 100 implementing the database session server 2 to the other components of the distributed database system such as the clients 6, the source database 4, the processing entity 16, or any further components.

Computing machine 100 includes a memory 106 such as main memory, random access memory (RAM) and/or any further volatile memory. The memory 106 may store data to maintain one or more database sessions such as database session control data 107. The memory 106 may also store data pieces 108 of the one or more database sessions 32.

A set of computer-executable instructions 109 (i.e., computer program code) embodying any one, or all, of the methodologies described herein, resides completely, or at least partially, in or on a machine-readable storage medium, e.g., the memory 106. For example, the instructions 109 may include software processes implementing the database functionality of the database session server 2, such as a relational database system (e.g. a SQL database) or an object-oriented database system. The instructions 109 may also implement the functionality of receiving, processing and responding to requests from the clients 6, publishing 38 updated data pieces, as well as receiving indications from a processing entity 16 (e.g. the indication listener as mentioned above). The instructions 109 may also implement the procedures to establish, maintain, and terminate database sessions 32.

The instructions 109 may further be transmitted or received as a propagated signal via the Internet through the network interface device 103 or via the user interface 102. Communication within computing machine is performed via a bus 104. Basic operation of the computing machine 100 is controlled by an operating system which is also located in the memory 106, the at least one processor 101 and/or the static memory 105.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

What is claimed is:

1. A method for processing a database session maintained in a database system comprising a client, a database session server and a source database, the database session server maintaining the database session with the client, the database session comprising a plurality of data pieces loaded from the source database to the database session server, and the method comprising, at the database session server during the database session:
   receiving, from the client, a first request to update at least a first data piece of the database session;
   responding, to the client, with a first response to indicate an update of the first data piece in accordance with the first request;
   publishing the update of the first data piece to enable further processing of the updated first data piece and/or any second data piece of the database session related to the updated first data piece using the source database;
   processing a first indication indicating that the updated first data piece is to be further updated and/or a second data piece of the database session is to be updated;
   receiving, from the client, a second request to update at least a third data piece of the database session; and
   responding, to the client, with a second response to indicate an update of the third data piece in accordance with the second request and an update of the updated first data piece and/or an update of the second data piece in accordance with the processed first indication.

2. The method of claim 1, wherein further processing of any second data piece of the database session related to the updated first data piece comprises determining whether the update of the first data piece causes a data inconsistency with any second data piece of the database session.

3. The method of claim 2, wherein the indication comprises indicating that the second data piece of the database session is to be updated in order to re-establish data consistency with the updated first data piece.

4. The method of claim 3, wherein the second response includes an indication of the updated second data piece of the database session which re-establishes data consistency with the updated first data piece.

5. The method of claim 1, wherein the second request comprises a request to further update the updated first data piece, and further comprising, at the database session server:
   responding, to the client, with the second response to indicate the further update of the updated first data piece in accordance with the second request, but omitting indicating the update of the updated first data piece and/or an update of the second data piece in accordance with the processed indication.

6. The method of claim 5, further comprising, at the database session server:
   publishing the further update of the updated first data piece to enable further processing of the further updated first data piece and/or any second data piece of the database session related to the further updated first data piece using the source database; and
   processing a second indication indicating that the further updated first data piece is to be still further updated and/or the second data piece of the database session is to be updated.

7. The method of claim 6, further comprising, at the database session server:
   receiving, from the client, a third request to update at least a fourth data piece of the database session; and
   responding, to the client, with a third response to indicate an update of the fourth data piece in accordance with the third request and a still further update of the further updated first data piece and/or an update of the second data piece in accordance with the processed second indication.

8. The method of claim 1, further comprising, at the database session server:
   when both the first indication and the second request indicate an update of the second data piece, performing a consistency check between the update of the second data piece indicated in the second request and the update of the second data piece indicated in the first indication; and
   in response to determining that the update of the second data piece indicated in the first indication is consistent with the update of the second data piece indicated in the second request, applying both updates to the second data piece to form an updated second data piece and including the updated second data piece in the second response.

9. The method of claim 8, further comprising, at the database session server:
in response to determining that the update of the second data piece indicated in the first indication is inconsistent with the update of the second data piece indicated in the second request, discarding the update indicated in the first indication, applying the update indicated in the second request to the second data piece to form the updated data piece, and including the updated second data piece in the second response; and
publishing the updated second data piece to enable further processing of the updated second data piece and/or any data piece of the database session related to the updated second data piece using the source database.

10. The method of claim 8, further comprising, at the database session server:
receiving multiple requests from the one or more clients to update one of more of the data pieces of the database session between responding with the first response and receiving the second request.

11. The method of claim 8, further comprising, at the database session server:
receiving, from the client, a commit request to terminate the database session and write back any updates to the data pieces of the database session processed during the database session to the source database;
performing a consistency procedure of the updates to the data pieces of the database session processed during the database session against the source database; and
executing the commit request and writing back the updated data pieces of the database session to the source database in response to the consistency procedure being successful.

12. A system comprising:
a database session server comprising a memory; and a processor, the database session server maintaining a database session with a client, the database session comprising a plurality of data pieces loaded from a source database to the database session server, the database session server being arranged to: receive, from the client, a first request to update at least a first data piece of the database session; respond, to the client, with a first response to indicate an update of the first data piece in accordance with the first request; publish the update of the first data piece to enable further processing of the updated first data piece and/or any second data piece of the database session related to the updated first data piece using the source database; process a first indication indicating that the updated first data piece is to be further updated and/or a second data piece of the database session is to be updated; receive, from the client, a second request to update at least a third data piece of the database session; and respond, to the client, with a second response to indicate an update of the third data piece in accordance with the second request and an update of the updated first data piece and/or an update of the second data piece in accordance with the processed first indication.

13. The system of claim 12, wherein further processing of any second data piece of the database session related to the updated first data piece comprises determining whether the update of the first data piece causes a data inconsistency with any second data piece of the database session.

14. The system of claim 13, wherein the indication comprises indicating that the second data piece of the database session is to be updated in order to re-establish data consistency with the updated first data piece.

15. The system of claim 14, wherein the second response includes an indication of the updated second data piece of the database session which re-establishes data consistency with the updated first data piece.

16. The system of claim 12, wherein the second request comprises a request to further update the updated first data piece, and the database session server is further arranged to:
respond, to the client, with the second response to indicate the further update of the updated first data piece in accordance with the second request, but omitting indicating the update of the updated first data piece and/or an update of the second data piece in accordance with the processed indication.

17. The system of claim 16, wherein the database session server is further arranged to:
publish the further update of the updated first data piece to enable further processing of the further updated first data piece and/or any second data piece of the database session related to the further updated first data piece using the source database; and
process a second indication indicating that the further updated first data piece is to be still further updated and/or the second data piece of the database session is to be updated.

18. The system of claim 17, wherein the database session server is further arranged to:
receive, from the client, a third request to update at least a fourth data piece of the database session; and
respond, to the client, with a third response to indicate an update of the fourth data piece in accordance with the third request and a still further update of the further updated first data piece and/or an update of the second data piece in accordance with the processed second indication.

19. The system of claim 12, wherein the database session server is further arranged to:
when both the first indication and the second request indicate an update of the second data piece, perform a consistency check between the update of the second data piece indicated in the second request and the update of the second data piece indicated in the first indication; and
in response to determining that the update of the second data piece indicated in the first indication is consistent with the update of the second data piece indicated in the second request, apply both updates to the second data piece to form an updated second data piece and including the updated second data piece in the second response.

20. The system of claim 19, wherein the database session server is further arranged to:
in response to determining that the update of the second data piece indicated in the first indication is inconsistent with the update of the second data piece indicated in the second request, discard the update indicated in the first indication, apply the update indicated in the second request to the second data piece to form the updated data piece, and include the updated second data piece in the second response; and
publish the updated second data piece to enable further processing of the updated second data piece and/or any data piece of the database session related to the updated second data piece using the source database.

21. The system of claim 12, wherein the database session server is further arranged to:
  receive multiple requests from the one or more clients to update one of more of the data pieces of the database session between responding with the first response and receiving the second request.

22. The system of claim 21, wherein the database session server is further arranged to:
  receive, from the client, a commit request to terminate the database session and write back any updates to the data pieces of the database session processed during the database session to the source database;
  perform a consistency procedure of the updates to the data pieces of the database session processed during the database session against the source database; and
  execute the commit request and writing back the updated data pieces of the database session to the source database in response to the consistency procedure being successful.

23. A computer program product comprising non-transitory computer-readable storage medium, the non-transitory computer-readable storage medium comprising instructions that, upon execution by a processor of a computing system, cause the computing system to maintain a database session with a client, the database session comprising a plurality of data pieces loaded from a source database to the database session server, and the instructions comprising:
  receive, from the client, a first request to update at least a first data piece of the database session;
  respond, to the client, with a first response to indicate an update of the first data piece in accordance with the first request;
  publish the update of the first data piece to enable further processing of the updated first data piece and/or any second data piece of the database session related to the updated first data piece using the source database;
  process a first indication indicating that the updated first data piece is to be further updated and/or a second data piece of the database session is to be updated;
  receive, from the client, a second request to update at least a third data piece of the database session; and
  respond, to the client, with a second response to indicate an update of the third data piece in accordance with the second request and an update of the updated first data piece and/or an update of the second data piece in accordance with the processed first indication.

\* \* \* \* \*